(12) United States Patent
Nakashima

(10) Patent No.: US 8,890,971 B2
(45) Date of Patent: Nov. 18, 2014

(54) IMAGE PROCESSING APPARATUS, IMAGE CAPTURING APPARATUS, AND COMPUTER PROGRAM

(71) Applicant: Panasonic Corporation, Osaka (JP)

(72) Inventor: Toshiyuki Nakashima, Hyogo (JP)

(73) Assignee: Panasonic Coporation, Osaka (JP)

( * ) Notice: Subject to any disclaimer, the term of this patent is extended or adjusted under 35 U.S.C. 154(b) by 32 days.

(21) Appl. No.: 13/738,132

(22) Filed: Jan. 10, 2013

(65) Prior Publication Data

US 2013/0176460 A1  Jul. 11, 2013

(30) Foreign Application Priority Data

Jan. 11, 2012  (JP) ................................ 2012-002736

(51) Int. Cl.
 *H04N 5/76*  (2006.01)
 *H04N 5/14*  (2006.01)
 *H04N 5/225* (2006.01)
 *H04N 5/232* (2006.01)

(52) U.S. Cl.
 CPC .......... *H04N 5/225* (2013.01); *H04N 5/23251* (2013.01); *H04N 5/144* (2013.01)
 USPC ....................... 348/222.1; 348/699

(58) Field of Classification Search
 CPC ............... H04N 19/00593; H04N 7/26861; H04N 19/00684; H04N 5/23251; H04N 5/144

USPC ............................................. 348/231.99, 699
 See application file for complete search history.

(56) References Cited

U.S. PATENT DOCUMENTS

| | | | |
|---|---|---|---|
| 2004/0052513 A1* | 3/2004 | Ohkawara et al. | 396/55 |
| 2009/0316789 A1* | 12/2009 | Sasai et al. | 375/240.16 |
| 2010/0066914 A1 | 3/2010 | Sato | |

FOREIGN PATENT DOCUMENTS

| | | |
|---|---|---|
| JP | 2006-317848 A | 11/2006 |
| JP | 2010-177739 A | 8/2010 |

OTHER PUBLICATIONS

Co-pending U.S. Appl. No. 13/738,042, filed Jan. 10, 2013.
Co-pending U.S. Appl. No. 13/738,280, filed Jan. 10, 2013.

* cited by examiner

*Primary Examiner* — Twyler Haskins
*Assistant Examiner* — Quang Le
(74) *Attorney, Agent, or Firm* — Renner, Otto, Boisselle & Sklar, LLP

(57) ABSTRACT

An image processing section includes: a motion vector calculation section for receiving information representing the magnitude of motion of an image capturing section and calculating a motion vector by performing a matching operation between first and second frames within a search range determined based on the magnitude of motion (a first search range and a second search range different from the first search range); and an interpolation frame generating section for generating an interpolation frame in accordance with the motion vector calculation result.

13 Claims, 7 Drawing Sheets

FIRST FRAME

SECOND FRAME

SEARCH RANGE FOR MOTION VECTOR

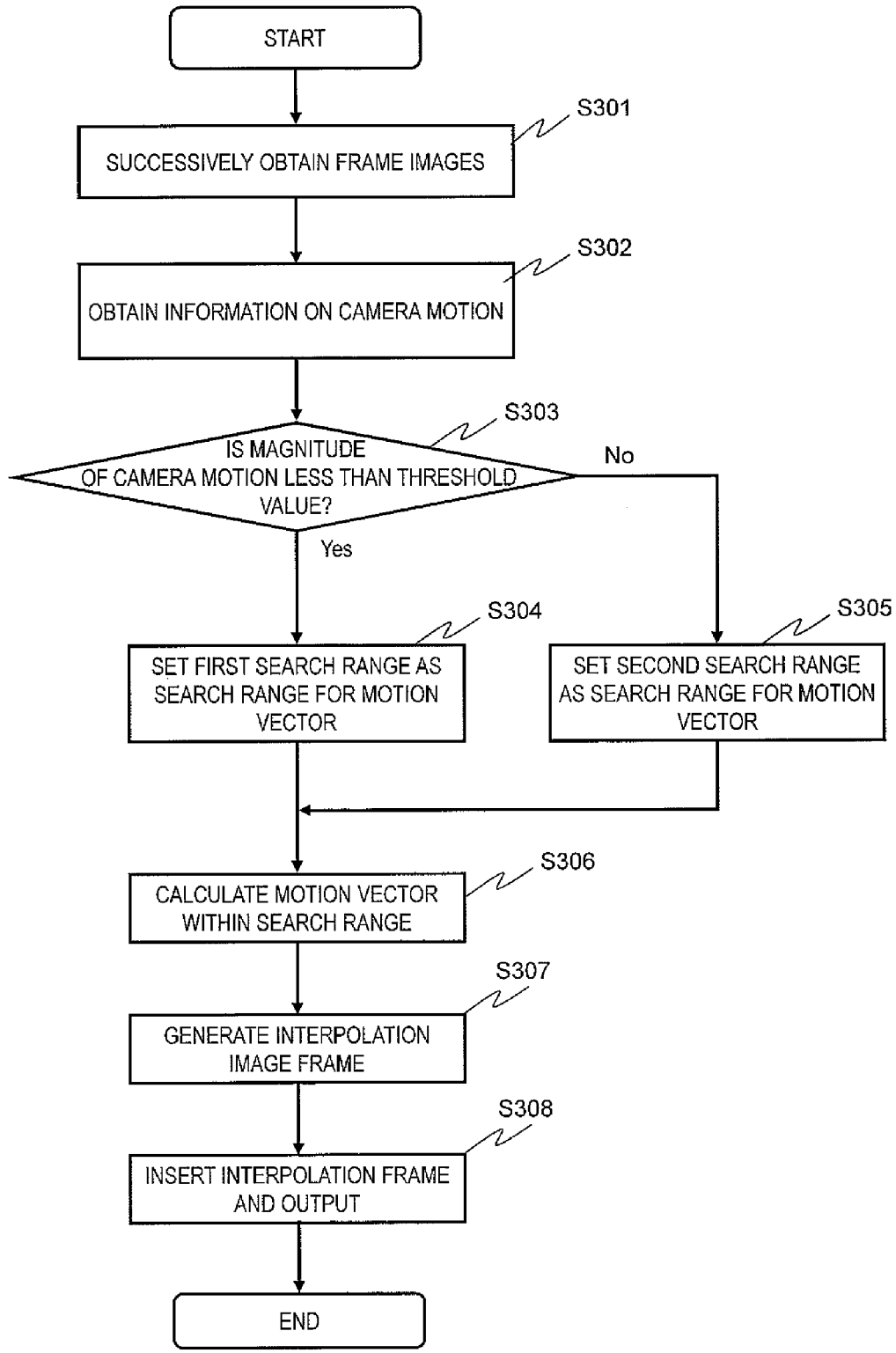

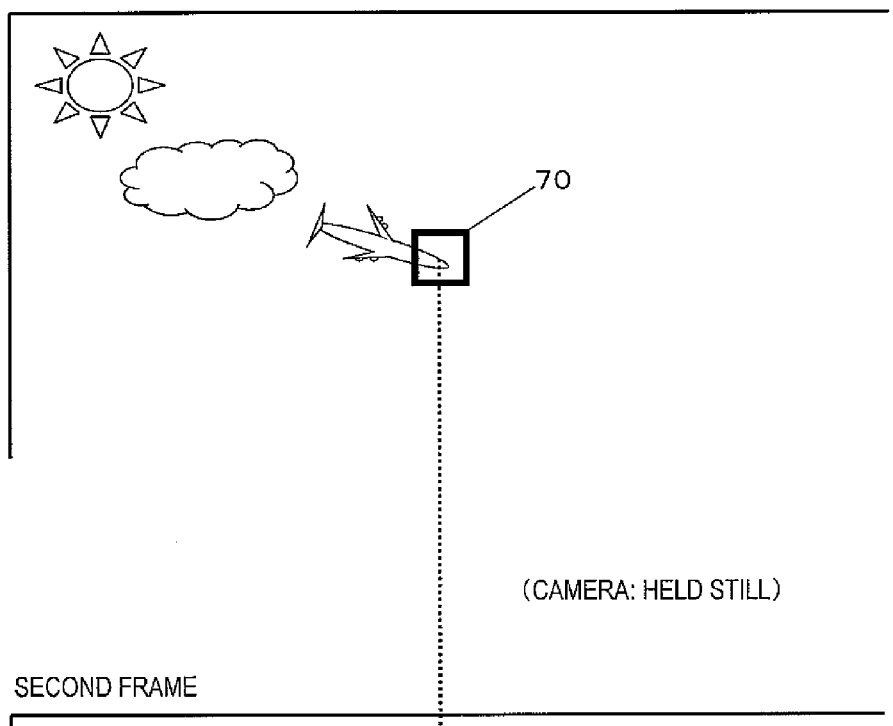
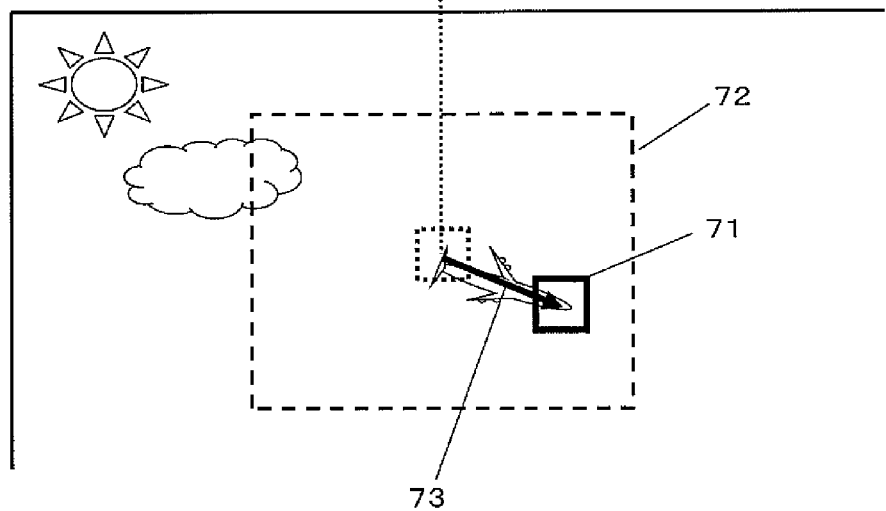
FIG. 7A

FIG. 7B
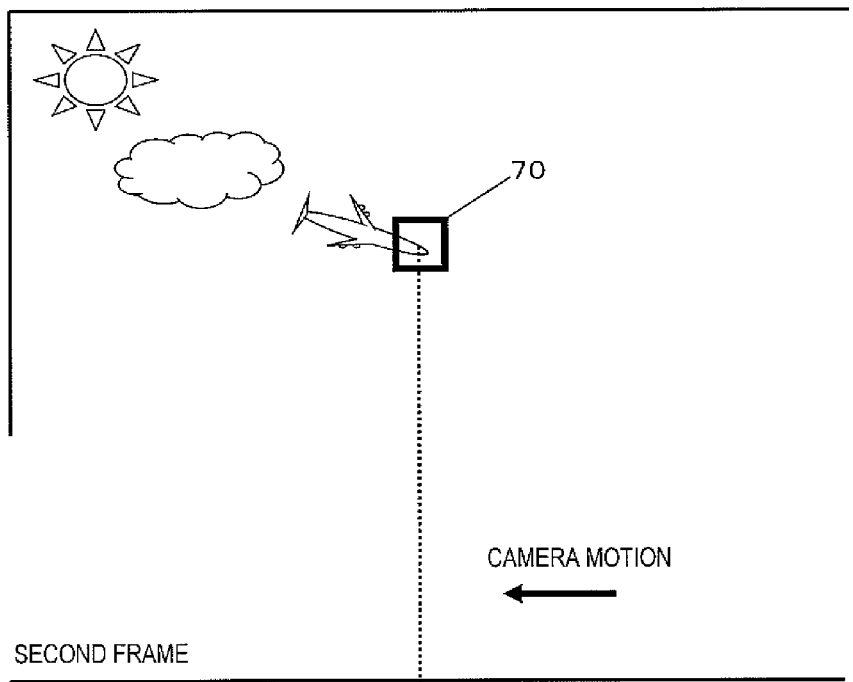
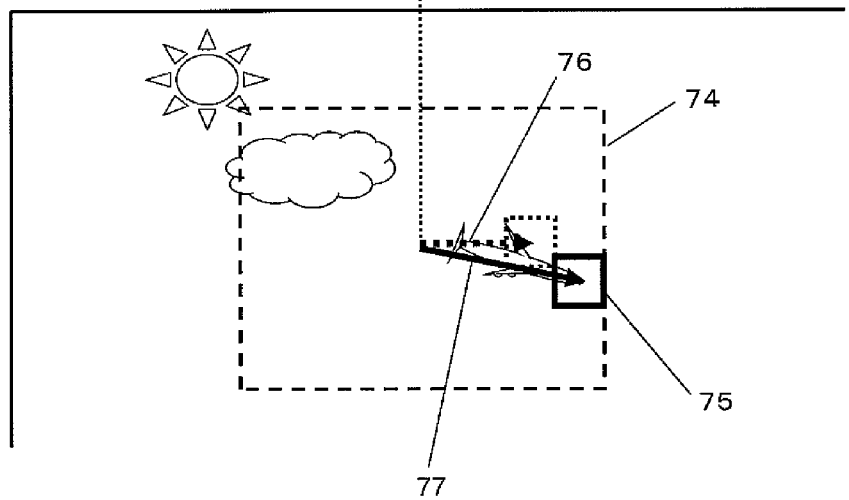

FIG. 7C
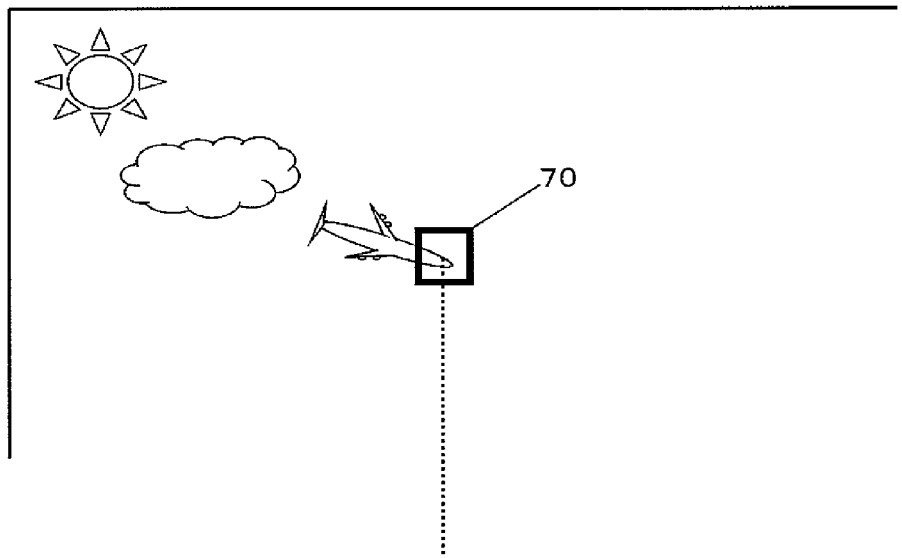
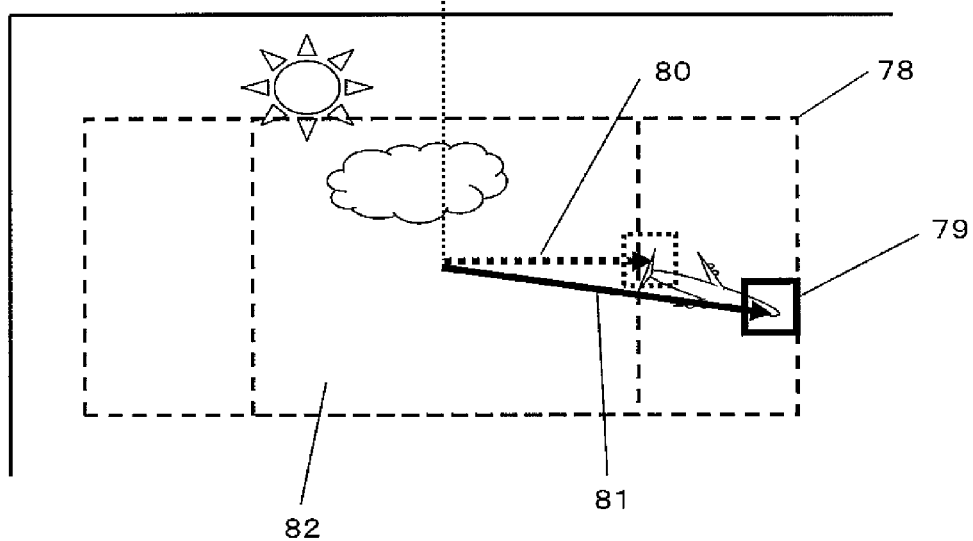

IMAGE PROCESSING APPARATUS, IMAGE CAPTURING APPARATUS, AND COMPUTER PROGRAM

BACKGROUND

1. Technical Field

The present disclosure relates to an image processing apparatus capable of converting a frame rate of a moving picture obtained through a shooting.

2. Description of the Related Art

Japanese Laid-Open Patent Publication No. 2010-177739 discloses an image processing apparatus. The image processing apparatus generates interpolation frame images to be inserted between frame images. The image processing apparatus of Japanese Laid-Open Patent Publication No. 2010-177739 calculates the search area for a motion vector of an interpolation pixel included in an interpolation frame image based on a change in the pixel value within each frame of a plurality of frame images, and generates an interpolation frame image based on a motion vector estimated in the calculated search area.

SUMMARY

When a digital video camera moves due to a camera shake or a panning operation during movie capturing operation, it may not be possible to obtain a motion vector with a high reliability and to generate an appropriate interpolation frame.

The present disclosure provides an image processing technique capable of generating a more appropriate interpolation frame even if the digital video camera moves.

An image processing apparatus according to one embodiment of the present disclosure generates an interpolation frame to be inserted between a first frame and a second frame, contiguous with each other, of a moving picture obtained by an image capturing section. The image processing apparatus includes: a motion vector calculation section for receiving information representing a magnitude of motion of the image capturing section and calculating a motion vector by performing a matching operation between the first and second frames within a search range determined based on the magnitude of motion; and an interpolation frame generation section for generating the interpolation frame in accordance with a result of the calculation of the motion vector.

With the technique of the present disclosure, it is possible to generate a more appropriate interpolation frame even if the digital video camera moves.

BRIEF DESCRIPTION OF THE DRAWINGS

FIG. 3 is a flow chart showing an operation performed by the image processing section of the digital video camera according to example Embodiment 1.

FIG. 7A is a diagram showing an example of first and second frames which are obtained when the digital video camera is held still.

FIG. 7B is a diagram showing an example of first and second frames which are obtained when the digital video camera moves slightly.

FIG. 7C is a diagram showing an example of first and second frames which are obtained when the digital video camera moves significantly.

DETAILED DESCRIPTION

Figure 1:
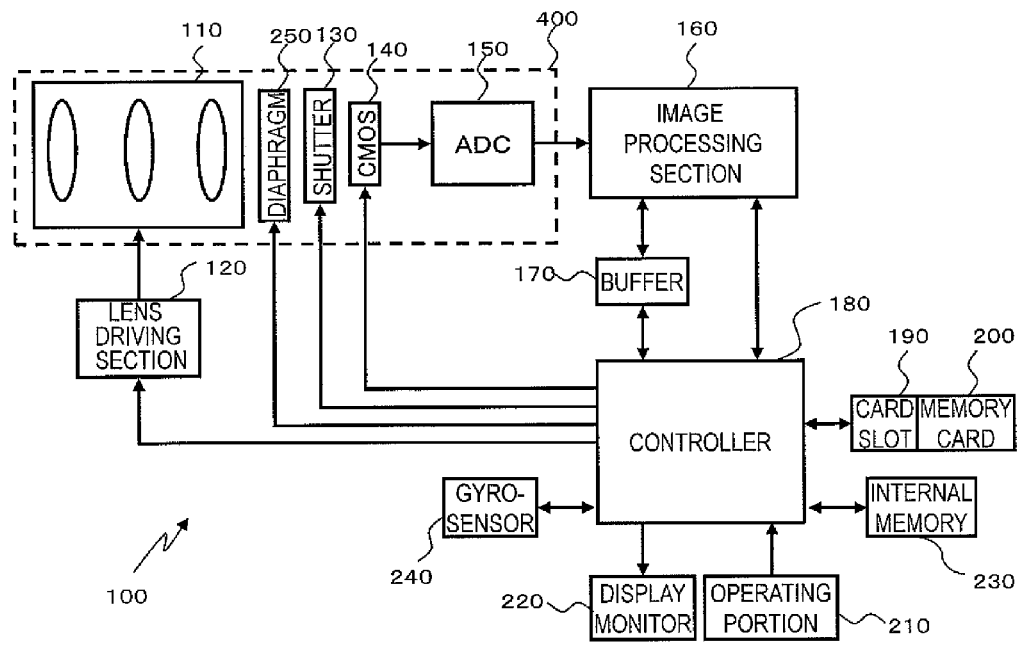
FIG. 1 is a block diagram showing a configuration of a digital video camera according to example Embodiment 1.

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventor provide the accompanying drawings and the following description in order for a person of ordinary skill in the art to sufficiently understand the present disclosure, and they are not intended to limit the subject matter set forth in the claims.

Embodiment 1

Embodiment 1, in which the technique of the present disclosure is applied to a digital video camera, will now be described with reference to the drawings. In the following description, data representing each of the individual still images of a moving picture will be referred to a "frame image" or simply a "frame". A frame to be inserted between two contiguous frames will be referred to as an "interpolation frame image" or simply an "interpolation frame".

[1-1. Outline]

A digital video camera 100 of the present embodiment is an image capturing apparatus capable of capturing a moving picture. The digital video camera 100 of the present embodiment is capable of converting a frame rate during or after the operation of capturing a moving picture. The digital video camera 100 of the present embodiment changes the frame rate by inserting an interpolation frame image between contiguous frame images obtained through a shooting. For example, when performing a movie capturing operation at 60 frames per second, the operation can be switched to a movie capturing operation at 120 frame per second by inserting interpolation frame images between frames. The time when the digital video camera 100 switches frame rates from one to another may be when a user gives an instruction to change the frame rate, when information (e.g., brightness information) obtained from an image captured through a shooting (hereinafter referred to as a "captured image".) is changed, or when a predetermined mode (e.g., a low-speed image capturing mode) is selected.

A configuration and an operation of a digital camera 100 according to the present embodiment will now be described with reference to the drawings.

[1-2. Configuration of Digital Video Camera]

First, a configuration of a digital video camera according to the present embodiment will be described with reference to FIG. 1. FIG. 1 is a block diagram showing a configuration of the digital video camera 100. The digital video camera 100 uses a CMOS image sensor 140 to capture an object image formed by an optical system 110 including one or more lenses. The image data generated by the CMOS image sensor 140 is subjected to various processes by an image processing section 160, and stored in a memory card 200. The configuration of the digital video camera 100 will now be described in detail.

The optical system 110 has a group of lenses, including a zoom lens and a focus lens. By moving the zoom lens along the optical axis, it is possible to enlarge/shrink the object image. By moving the focus lens along the optical axis, it is possible to adjust the focus of the object image. Note that while three lenses are shown in FIG. 1 as an example, the number of lenses of the optical system 110 is appropriately determined in accordance with the required functionality.

A lens driving section 120 drives various lenses included in the optical system 110. The lens driving section 120 includes, for example, a zoom motor for driving the zoom lens and a focus motor for driving the focus lens.

A diaphragm 250 adjusts the size of the opening, thereby adjusting the amount of light to pass therethrough, in accordance with the user settings or automatically.

A shutter 130 blocks light from entering the CMOS image sensor 140.

The CMOS image sensor 140 captures an object image formed by the optical system 110 to generate image data. The CMOS image sensor 140 performs various operations, such as exposure, transfer, electronic shutter, etc. The CMOS image sensor 140 generates new image data at intervals of a certain amount of time.

An A/D converter (ADC) 150 is a circuit for converting analog image data generated by the CMOS image sensor 140 to digital image data.

In the present embodiment, a plurality of elements including the optical system 110, the diaphragm 250, the shutter 130, the CMOS sensor 140 and the ADC 150 together form an image capturing section 400. The image capturing section 400 generates and outputs digital moving picture data including a plurality of contiguous frames.

The image processing section 160 performs various processes on the image data generated by the CMOS image sensor 140, to generate image data to be displayed on a display monitor 220, and image data to be stored in the memory card 200. For example, the image processing section 160 performs various processes, such as gamma correction, white balance correction, defect correction, etc., on the image data generated by the CMOS image sensor 140. The image processing section 160 compresses image data generated by the CMOS image sensor 140 in accordance with a compression scheme, etc., in conformity with the H.264 standard, the MPEG2 standard, or the like. The image processing section 160 can be implemented by a digital signal processor (DSP), a microcomputer, or the like, for example.

The image processing section 160 can calculate the motion vector based on the image data (frame) generated by the CMOS image sensor 140. Then, the image processing section 160 can generate an interpolation frame image by motion compensation based on the calculated motion vector and the frame image associated with the motion vector. Alternatively, the image processing section 160 can generate an interpolation frame through averaging by adding together a plurality of correlated frame images at a predetermined ratio without using motion compensation. The details of the process of generating these interpolation frames will be described later.

A controller 180 controls the entire digital camera. The controller 180 receives a gyro signal to be described later, and converts the magnitude of motion of the digital video camera 100 (hereinafter referred to as the "magnitude of camera motion") into the number of pixels in accordance with the received gyro signal. The controller 180 sends the information representing the calculated number of pixels (hereinafter referred to as the "camera motion information") to the image processing section 160. The controller 180 can be implemented by a semiconductor device, or the like. The controller 180 may be implemented only by hardware, or may be implemented by a combination of hardware and software. The controller 180 can be implemented by, for example, a microcomputer, or the like. Alternatively, it may be implemented by a single semiconductor chip, together with the image processing section 160, etc.

A buffer 170 serves as a work memory of the image processing section 160 and the controller 180. The buffer 170 can be implemented by, for example, a DRAM, a ferroelectric memory, or the like.

A card slot 190 is capable of receiving the memory card 200, and can be mechanically and electrically connected to the memory card 200. The memory card 200 includes therein a flash memory, a ferroelectric memory, or the like, and can store data such as an image file generated by the image processing section 160.

An internal memory 230 is, for example, a flash memory, or a ferroelectric memory. The internal memory 230 stores a control program, etc., for controlling the entire digital video camera 100. The control program is executed by the controller 180.

An operating portion 210 generally refers to a user interface via which user operations are accepted. The operating portion 210 includes, for example, a cross-shaped key, an OK button, and the like, via which user operations are accepted.

The display monitor 220 is capable of displaying an image (through image) represented by image data generated by the CMOS image sensor 140, and an image represented by image data read out from the memory card 200. The display monitor 220 can also display various menu screens, etc., used for changing various settings of the digital video camera 100.

A gyrosensor 240 (motion detector) detects a shake in the yawing direction and a movement in the pitching direction based on the angular change over unit time, i.e., the angular velocity, of the digital video camera 100. The gyrosensor 240 outputs a gyro signal, representing the detected magnitude of motion, to the controller 180. Note that since the image capturing section 400 is included in the digital video camera 100, the gyrosensor 240 is detecting a shake in the yawing direction and a motion in the pitching direction based on the angular velocity of the image capturing section 400.

Note that the configuration described above is merely an example, and the digital video camera 100 may have any configuration as long as the image processing section 160 can perform an operation to be described below.

[1-3. Configuration of Image Processing Section 160]

Figure 2:
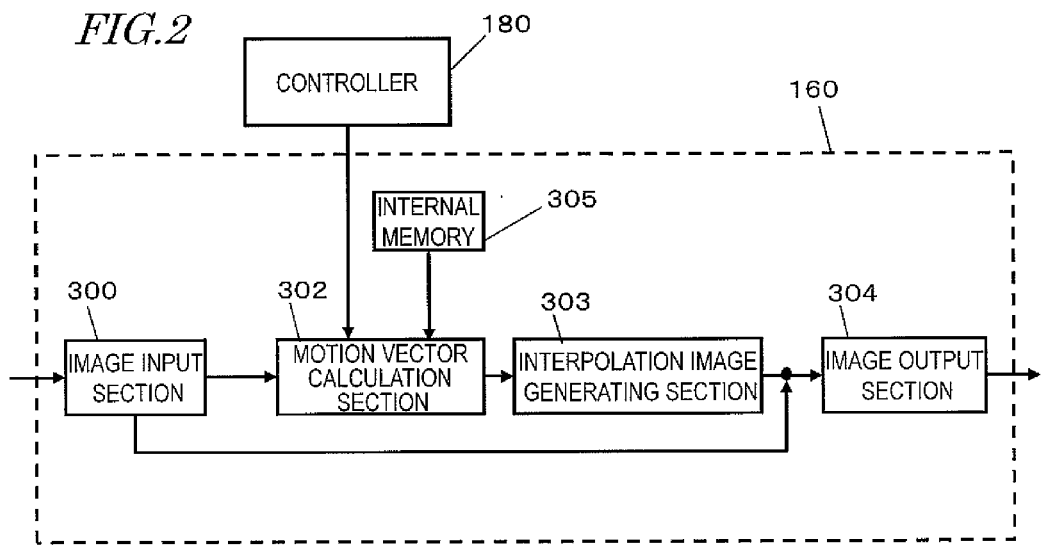
FIG. 2 is a diagram showing a configuration of an image processing section of the digital video camera according to example Embodiment 1.

The digital video camera 100 of the present embodiment has the function of generating, from a first frame and a second frame contiguous in time with each other, an interpolation frame to be inserted between the first frame and the second frame. FIG. 2 is a block diagram showing a configuration of the image processing section 160 for realizing the operation described above of the digital video camera 100 according to the present embodiment.

The image processing section 160 includes: an image input section 300 for receiving moving picture data output from the image capturing section 400; a motion vector calculation section 302 for calculating a motion vector between two contiguous frames; an interpolation frame generation section 303 for generating an interpolation frame to be inserted between two frames; an image output section 304 for outputting, to the outside, the moving picture data which has been interpolated with the interpolation frame; and an internal memory 305 for storing various information. These elements may be implemented by individual circuit blocks physically separated from one another, or may be implemented by a processor provided in the image processing section 160 executing programs defining the processes of the elements.

[1-4. Operation]

Now, an operation of the digital video camera 100 according to the present embodiment will be described.

When the power is turned ON, the controller 180 supplies power to various sections of the digital video camera 100. The digital video camera 100 can be switched between the shooting mode and the playback mode by a user operation, or the like. After power is supplied, if the digital video camera 100 has been set in the shooting mode, the controller 180 initializes the optical system 110, the CMOS image sensor 140, etc., to set up the camera ready for shooting. Upon completing the setup operation for shooting, the controller 180 controls the CMOS image sensor 140 to capture an image, instructs the image processing section 160 so as to convert the image signal, which has been converted by the A/D converter 150 to a digital signal, to a signal that can be displayed as the through image, and performs a control so that the generated through image is displayed on the display monitor 220. By looking at the through image displayed on the display monitor 220, the user can check the angle of view, the object, etc., during the shooting. The user can depress a movie recording button (a part of the operating portion 210) at any point in time to instruct the controller 180 to record a moving picture. Upon receiving an instruction to record a moving picture, the controller 180 processes the image being captured by the CMOS image sensor 140 as a moving picture in a format in conformity with a predetermined standard, and starts recording the processed moving picture data on the memory card 200. On the other hand, the user can depress the movie recording button at any point in time during the movie recording operation to instruct the controller 180 to end the moving picture recording operation.

With the digital video camera 100, it is possible to change the frame rate of the moving picture captured during the movie recording operation. The time when the frame rate is changed may be, for example, when a user gives an instruction, when information (e.g., brightness information) obtained from the captured image is changed, or when a predetermined mode (e.g., a low-speed image capturing mode) is selected. Alternatively, a change of the frame rate may be programmed in advance.

When the frame rate needs to be changed, the image processing section 160 generates an interpolation frame image to be inserted between frame images.

Referring to FIG. 3, the process of generating the interpolation frame image by the image processing section 160 will now be described. FIG. 3 is a flow chart showing the interpolation frame image generating process performed by the image processing section 160. First, the image input section 300 successively obtains frame images output from an image capturing section 400 (step S301). The frame images obtained by the image input section 300 are sent to the motion vector calculation section 302, and the image output section 304.

The motion vector calculation section 302 obtains frame images transmitted from the image input section 300 and camera motion information transmitted from the controller 180 (step S302). The internal memory 305 has, stored therein in advance, information representing the threshold value of the magnitude of camera motion. The motion vector calculation section 302 compares the magnitude of camera motion with the threshold value (step S303). If the magnitude of camera motion is less than the threshold value, the motion vector calculation section 302 sets a first search range as the search range for a motion vector of an object between contiguous first and second frames (step S304). If the magnitude of camera motion is greater than or equal to the threshold value, the motion vector calculation section 302 sets a second search range, which is different from the first search range, as the search range for a motion vector of an object between the contiguous first and second frames (step S305). Note that the details of the first search range and the second search range will be described later.

Through a process to be described later, motion vectors between two contiguous ones of the frames successively received from the image input section 300 are successively calculated within the first search range or the second search range (step S306). Information representing the calculated motion vector is sent to an interpolation image generating section 303.

Then, the interpolation image generating section 303 generates an interpolation frame in accordance with the motion vector calculation result (step S307). Finally, the image output section 304 inserts an interpolation frame between two contiguous frames and outputs the resultant data to the outside of the image processing section 160 (step S308).

The processes will now be described in detail.

Referring to FIGS. 4A to 4C, 5A to 5B, 6, and 7A to 7C, a specific example of a motion vector search and calculation operation performed by the motion vector calculation section 302 will be described.

Figure 4A:
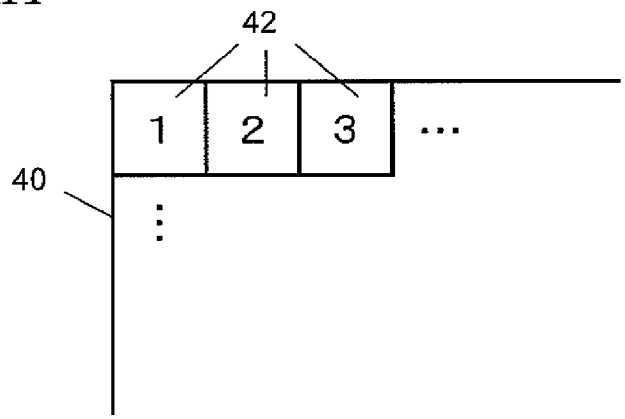
FIG. 4A is a diagram showing that one frame is divided into a plurality of macroblocks.
Figure 4B:
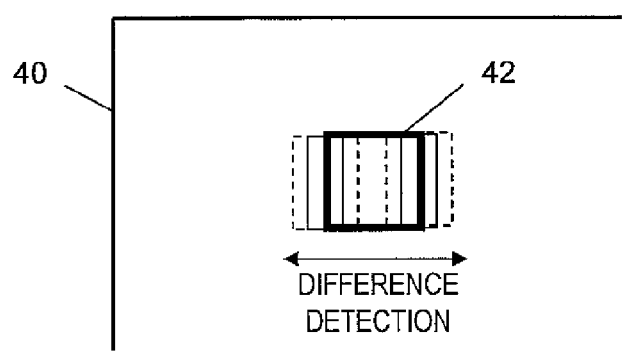
FIG. 4B is a diagram showing an operation of performing the difference detection in the horizontal direction while shifting one macroblock in the horizontal direction.
Figure 4C:
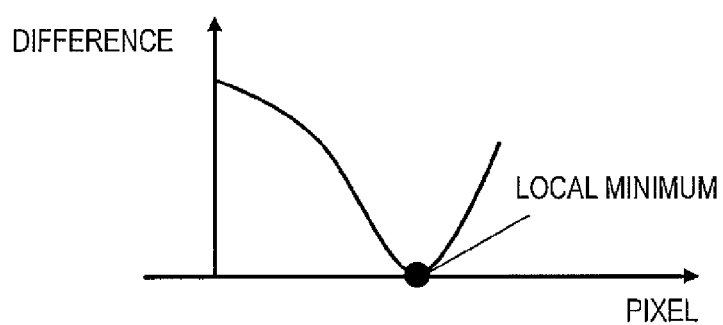
FIG. 4C is a graph showing the relationship of a difference evaluation value (SAD) with respect to the shift amount for one macroblock.

FIGS. 4A to 4C show a specific example of difference evaluation for individual macroblocks by the motion vector calculation section 302. The motion vector calculation section 302 obtains frames contiguous in time with each other from the image input section 300. As shown in FIG. 4A, the motion vector calculation section 302 detects the direction and the magnitude of the motion vector by the unit of macroblocks 42 each including 16 pixels×16 pixels, for example, between the first and second frames contiguous in time with each other. Specifically, as shown in FIG. 4B, the motion vector calculation section 302 compares a certain macroblock in one of the first and second frames contiguous in time with each other with a block (hereinafter referred to as the "corresponding block") including 16 pixels×16 pixels that is shifted by one pixel in the horizontal direction from the pixel position in the other frame corresponding to the certain macroblock, to calculate the difference therebetween. The motion vector calculation section 302 also compares a certain macroblock in one frame with a corresponding block that is shifted by one pixel in the vertical direction from the pixel position in the other frame corresponding to the certain macroblock (not shown), to calculate the difference therebetween.

The difference is evaluated in terms of an evaluation function such as SAD (Sum of Absolute Difference) or SSD (Sum of Squared Difference).

Where SAD is used as the evaluation function, the motion vector (dx(x,y),dy(x,y)) at the coordinate position (x,y) on the image is determined by obtaining dx and dy that minimize the evaluation function P1(x,y,dx,dy) represented by Expression 1 below. Herein, the size of the macroblock, calculated in the number of pixels, in the horizontal direction (the x direction) of the image and that in the vertical direction (the y direction) are denoted as Bx and By, respectively. Of the two frames to be compared with each other, the pixel value (the brightness value or the value of a particular color component) of the preceding frame is denoted as L1, and that of the following frame as L2.

$$P1(x, y, dx, dy) = \sum_{i=-Bx/2}^{Bx/2} \sum_{j=-By/2}^{By/2} |L1(x+i, y+j) - L2(x+dx+i, y+dy+j)|$$ (Expression 1)

On the other hand, where SSD is used as the evaluation function, the motion vector (dx(x,y),dy(x,y)) at the coordinate position (x,y) on the image is determined by obtaining dx and dy that minimize the evaluation function P2(x,y,dx,dy) represented by Expression 2 below.

$$P2(x, y, dx, dy) = \sum_{i=-Bx/2}^{Bx/2} \sum_{j=-By/2}^{By/2} (L1(x+i, y+j) - L2(x+dx+i, y+dy+j))^2$$ (Expression 2)

By using an evaluation function represented by Expression 1 or 2, the motion vector calculation section 302 can calculate the motion vector (dx(x,y),dy(x,y)) for each macroblock.

The motion vector calculation section 302 obtains the difference at each pixel position by calculating the difference while shifting the macroblock by one pixel at a time in the horizontal direction and the vertical direction within the first search range or the second search range mentioned with reference to FIG. 3.

FIG. 4C is a graph plotting an example of the difference (SAD) between a certain macroblock and the corresponding macroblock obtained by shifting pixels in the horizontal direction. As differences at different pixel positions are plotted, there is obtained a wave-shaped plot with a minimum difference value as shown in FIG. 4C. The motion vector calculation section 302 detects the distance (unit: pixels) from the center position of the macroblock being processed to the pixel position at which SAD takes the local minimum value and the direction from the center position to the pixel position at which SAD takes the local minimum value as the magnitude and the direction, respectively, of a motion vector.

Through the process described above, the motion vector calculation section 302 calculates the motion vector.

Figure 5A:
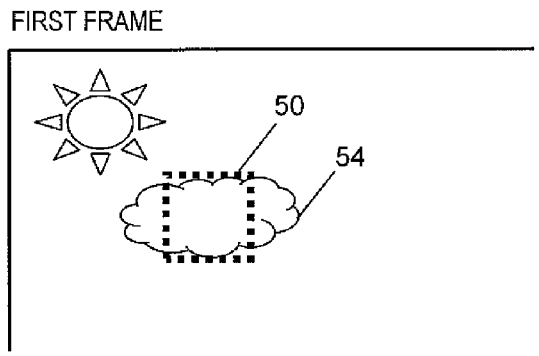
FIG. 5A is a diagram showing an example of a first frame.
Figure 5B:
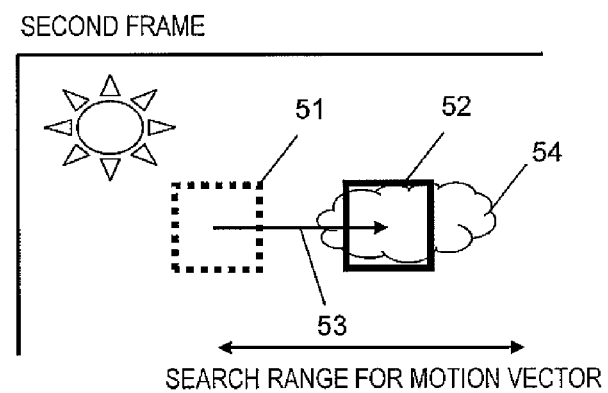
FIG. 5B is a diagram showing an example of a second frame following the first frame.

Then, referring to FIGS. 5A and 5B, an example of how a motion vector is searched for within a search range for a motion vector will be described. FIG. 5A shows an example of a first frame. FIG. 5B shows an example of a second frame following the first frame. As compared with the image of the first frame, a portion (a cloud 54) of an object of the second frame is shifted by 32 pixels in the horizontal direction of the image. As shown in FIG. 5B, the motion vector calculation section 302 performs a pattern matching operation while shifting the macroblock in the horizontal direction of the image from an area 51 indicated by a broken line in the second frame, which corresponds to the pixel position of a macroblock 50 in the first frame. Within the search range for a motion vector shown in FIG. 5B, the pattern matches at an area 52 indicated by a solid line in FIG. 5B, yielding the minimum SAD. The magnitude of a motion vector 53 is 32 pixels and the direction of the motion vector is the rightward direction in the horizontal direction.

The controller 180 sends the camera motion information to the motion vector calculation section 302 in the image processing section 160. As already described above, the camera motion information includes information of the magnitude of camera motion.

The motion vector calculation section 302 sets the search range for a motion vector based on the magnitude of camera motion represented by the obtained information. More specifically, the motion vector calculation section 302 sets the first search range or the second search range as the search range for a motion vector based on the magnitude of camera motion.

Figure 6:
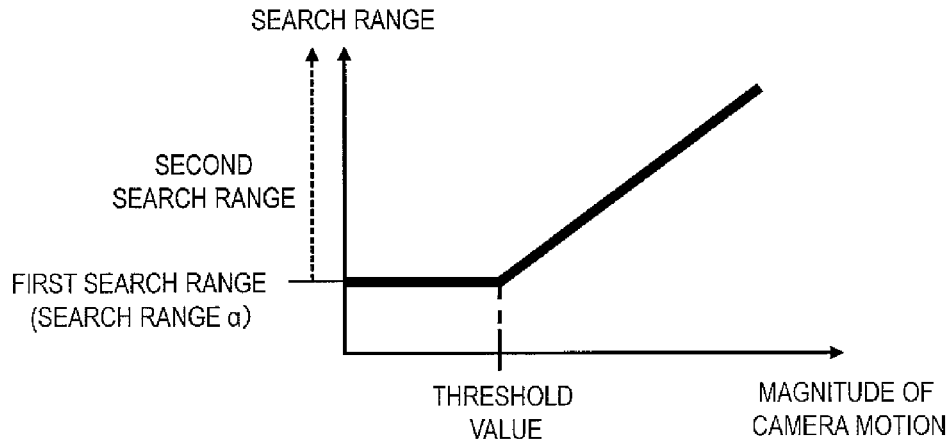
FIG. 6 is a graph showing the relationship between the magnitude of motion of the digital video camera and the search range according to example Embodiment 1.

Now, referring to FIG. 6, the details of the first search range and the second search range will be described. FIG. 6 shows the relationship between the magnitude of camera motion and the search range for a motion vector. The horizontal axis represents the magnitude of camera motion, and the vertical axis represents the search range for a motion vector. In the present embodiment, if the magnitude of camera motion is less than the threshold value, a fixed search range α is used as the search range for a motion vector, and if the magnitude of camera motion is greater than or equal to the threshold value, the search range for a motion vector is extended in the horizontal direction.

First, the first search range will be described. The first search range is a search range for a motion vector set when the magnitude of camera motion is less than the threshold value. As already described above, the information representing the threshold value is stored in advance in the internal memory 305. The internal memory 305 stores information representing the fixed search range α. In the present embodiment, as the fixed search range α, the internal memory 305 stores, for example, information representing a search range extending over three macroblocks left and right in the horizontal direction of the image and two macroblocks up and down in the vertical direction of the image. The first search range is set based on the fixed search range α as shown in FIG. 6. Specifically, the first search range is extending over three macroblocks left and right in the horizontal direction of the image and two macroblocks up and down in the vertical direction of the image. Thus, if the magnitude of camera motion is less than the threshold value, the motion vector calculation section 302 calculates the motion vector by limiting the search range for a motion vector to the first search range.

Now, the reason for limiting the search range for a motion vector to a fixed value not dependent on the magnitude of camera motion when the magnitude of camera motion is less than the threshold value will be described. That is because where the magnitude of camera motion is less than the threshold value, the motion vector can be calculated within a fixed search range unless an object moves significantly (as long as an image of a stationary object is being captured). Where the search range for a motion vector is not limited to a fixed search range when the magnitude of camera motion is less than the threshold value, the motion vector calculation section 302 will be searching for a motion vector even over areas that would otherwise not need to be searched for, lowering the efficiency of the calculation process.

In the present embodiment, if the magnitude of camera motion is less than the threshold value, the search range for a motion vector is limited to the first search range. Thus, it is possible to prevent the efficiency of the calculation process from lowering. Note that the predetermined threshold value for the magnitude of camera motion is determined so that an appropriate interpolation frame image is obtained based on the specifications of the individual digital video camera.

Next, the second search range will be described. The second search range is a search range for a motion vector that is set when the magnitude of camera motion is greater than or equal to the threshold value. As shown in FIG. 6, the second search range is extended based on the magnitude of camera motion. In other words, if the magnitude of camera motion is greater than or equal to the threshold value, the search range for a motion vector in the horizontal direction is set by the motion vector calculation section 302 to be extended based on the magnitude of camera motion.

Now, the reason for setting the search range for a motion vector to be extended based on the magnitude of camera motion when the magnitude of camera motion is greater than or equal to the threshold value will be described. If the magnitude of camera motion is greater than or equal to the threshold value, there is a high possibility that an object image is moving significantly within the frame due to the motion of the digital video camera 100. Thus, there is a high possibility that no pattern match is found within the first search range even if one attempts to calculate a motion vector while limiting the search range for a motion vector to a fixed search range (the first search range).

With the digital video camera 100 of the present embodiment, if the magnitude of camera motion is greater than or equal to the threshold value, the search range is set by the motion vector calculation section 302 so that the search range in the horizontal direction is extended based on the magnitude of camera motion. Through the process described above, it is possible to increase the possibility that a pattern match is found in the second search range even if an object image moves significantly within the frame due to the motion of the digital video camera 100.

In the present embodiment, the amount by which the macroblock being processed is shifted at a time is one pixel. However, the present disclosure is not limited thereto. Where the magnitude of camera motion is greater than or equal to the threshold value, the amount by which the macroblock being processed is shifted during a pattern matching operation may be increased as the magnitude of camera motion increases. For example, when the amount by which the macroblock being processed is shifted is three pixels in the horizontal direction, it is possible to perform the calculation process efficiently even if the search range for a motion vector is extended three-fold in the horizontal direction because the amount by which the macroblock is shifted is also increased three-fold.

Next, referring to FIGS. 7A to 7C, a specific example of how a motion vector is calculated within the first search range and the second search range will be described.

FIG. 7A shows an example of first and second frames which are obtained when the digital video camera 100 is held still. First, since the magnitude of camera motion is "0", the motion vector calculation section 302 sets the first search range as the search range 72 for a motion vector. The first search range is set based on information stored in advance in the internal memory 305. In the present embodiment, the first search range extends over three macroblocks left and right in the horizontal direction and two macroblocks up and down in the vertical direction. Within the first search range, in an area 71 of a solid line in the second frame, the pattern of the area 71 matches the pattern of the macroblock 70 in the first frame, yielding the minimum SAD. The motion vector calculation section 302 calculates a motion vector 73.

FIG. 7B shows an example of first and second frames which are obtained when the digital video camera 100 moves slightly to the left in the yawing direction. Now, in the present embodiment, the threshold value for the magnitude of camera motion is 32 pixels in the horizontal direction. If the magnitude of camera motion is 30 pixels in the horizontal direction, the magnitude of camera motion is less than the threshold value. Therefore, the motion vector calculation section 302 sets the first search range as a search range 74 for a motion vector. Within the first search range, in an area 75 of a solid line in the second frame, the pattern of the area 75 matches the pattern of the macroblock 70 in the first frame, yielding the minimum SAD. The motion vector calculation section 302 calculates a motion vector 77. The motion vector 77 is a vector obtained by adding a motion vector 76 of the camera to the motion vector of the object itself.

FIG. 7C shows an example of first and second frames which are obtained when the digital video camera 100 moves significantly to the left in the yawing direction. If the magnitude of camera motion is 48 pixels in the horizontal direction, the magnitude of camera motion is greater than or equal to the threshold value. Therefore, the motion vector calculation section 302 sets the second search range as a search range 78 for a motion vector. In the example shown in FIGS. 7A and 7B, the fixed search range α (extending over three macroblocks left and right in the horizontal direction and two macroblocks up and down in the vertical direction) is the search range for a motion vector. On the other hand, in the example of the search range for a motion vector shown in FIG. 7C, the search range in the horizontal direction is extended based on the magnitude of camera motion, and is extended by two macroblocks left and right in the horizontal direction, for example. Thus, the search range 78 for a motion vector extends over five macroblocks left and right in the horizontal direction. Within the search range 78 for a motion vector, in an area 79 of a solid line in the second frame, the pattern of the area 79 matches the pattern of the macroblock 70 in the first frame, yielding the minimum SAD. The motion vector calculation section 302 calculates a motion vector 81. The motion vector 81 is a vector obtained by adding a motion vector 80 of the camera to the motion vector of the object itself.

In contrast, where the search range in the horizontal direction is not extended based on the magnitude of camera motion, the search range for a motion vector will be an area 82 of a broken line, and no pattern match is found within the area 82 with the pattern of the macroblock 70 in the first frame. That is, the motion vector calculation section 302 cannot detect a motion vector.

Note that while the fixed search range α for a motion vector is determined by the unit of macroblocks in the present embodiment, the present disclosure is not limited thereto. That is, the predetermined search range for a motion vector may be determined by the unit of pixels.

While the search range is extended left and right in the horizontal direction based on the magnitude of camera motion when the magnitude of camera motion is greater than or equal to the threshold value in the present embodiment, the present disclosure is not limited thereto. The camera motion information transmitted from the controller 180 may include information representing the direction of the camera motion. The motion vector calculation section 302 may further limit the search range for a motion vector based on the information representing the direction of the motion of the camera. This is because it is only necessary to be able to detect a movement of an object in the frame as shown in FIG. 7C, and it is not always necessary to extend the search range in the direction opposite to the direction in which the object moves (the direction of the camera motion).

Below is a summary of the operation of the motion vector calculation section 302. The motion vector calculation section 302 sets the search range for a motion vector based on the magnitude of camera motion. Thus, it is possible to efficiently calculate the motion vector even if the magnitude of camera motion changes, and it is possible to more appropriately obtain an interpolation frame image.

Referring back to FIG. 2, the motion vector calculation section 302 sends frame images contiguous in time with each other obtained from the image input section 300 and the detected motion vector to the interpolation image generating section 303. The motion vector calculation section 302 sends the motion vector detected for each of the macroblocks of the frame being processed to the interpolation image generating section 303.

The interpolation image generating section 303 shifts an image represented by the macroblock which was being processed when calculating a motion vector from one of the first and second frames contiguous in time with each other to an intermediate position of the motion vector in accordance with the detected motion vector (motion-compensated interpolation). By similarly performing motion-compensated interpolation for all the macroblocks of the frame, the interpolation image generating section 303 generates an interpolation frame image to be inserted between the first and second frames contiguous in time with each other. Note that the interpolation frame image does not always have to be a frame of an intermediate state as long as it is a frame representing a transitional state between the two contiguous frames generated based on the motion vector.

The interpolation image generating section 303 sends the generated interpolation frame image to the image output section 304.

The image output section 304 successively inserts interpolation frame images between corresponding frame images contiguous in time with each other (between the first and second frames), and outputs the resultant data. Through these processes, the image processing section 160 can output a moving picture whose frame rate has been changed.

[1-5. Advantageous Effects, Etc.]

As described above, in the present embodiment, the image processing section 160 includes: the motion vector calculation section 302 for receiving information representing the magnitude of motion of the image capturing section 400 and calculating a motion vector by performing a matching operation between first and second frames within a search range determined based on the magnitude of motion (the first search range and the second search range different from the first search range); and the interpolation frame generating section 303 for generating an interpolation frame in accordance with the motion vector calculation result. Thus, it is possible to detect a motion vector while taking into consideration the magnitude of motion of the image capturing section 400, and it is possible to generate a more appropriate interpolation frame. Therefore, even if the frame rate is changed to a higher frame rate, it is possible to display a moving picture with a higher image quality on the display monitor.

The internal memory 305 stores information representing the search range for a motion vector. The first search range is set based on the information representing the search range for a motion vector. Thus, if the magnitude of motion of the image capturing section 400 is less than the threshold value, the search range for a motion vector is limited to a predetermined search range, and it is possible to prevent the efficiency of the calculation process from lowering.

The second search range is determined based on the magnitude of motion of the image capturing section 400. Thus, it is possible to obtain a motion vector with a high reliability even when an object image moves significantly within the frame due to a motion of the image capturing section 400.

The motion vector calculation section 302 receives information representing the direction of motion of the image capturing section 400, and further limits the search range based on the direction of motion. Thus, since the search range is not extended in the direction of motion of the image capturing section 400, it is possible to more efficiently obtain the motion vector.

The motion vector calculation section 302 divides each of the first and second frames into a plurality of portions, and performs a matching operation between the first and second frames for each of the divided portions to calculate the motion vector for the portion. The interpolation image generating section 303 generates the interpolation frame based on the motion vector calculated for each of the portions. Thus, it is possible to realize an interpolation process that reflects the motion of an object for each portion of the frame, and it is possible to generate a more appropriate interpolation frame.

OTHER EMBODIMENTS

Embodiment 1 has been described above as an example of the technique disclosed in the present application. However, the technique of this disclosure is not limited thereto, but is also applicable to other embodiments in which changes, replacements, additions, omissions, etc., are made as necessary. Different ones of the elements described in Embodiment 1 above may be combined together to obtain a new embodiment.

In view to this, other embodiments are illustrated hereinbelow.

The CMOS image sensor 140 is illustrated as an image capturing means in the embodiment above, but the image capturing means is not limited thereto. For example, the image capturing means may be implemented by a CCD image sensor or an NMOS image sensor.

The image processing section 160 and the controller 180 may be implemented by a single semiconductor chip, or by separate semiconductor chips.

The embodiment above is directed to an example where the technique of the present disclosure is applied to the digital video camera 100 (image capturing apparatus). However, the application of the technique of the present disclosure is not limited to the image capturing apparatus, but the technique is also applicable to an image processing apparatus capable of serving as the image processing section 160 described above, for example. The configuration of such an image processing apparatus is similar to that shown in FIG. 2, for example, and the operation thereof is similar to that shown in FIG. 3, for example. For example, the image processing apparatus can obtain data of a moving picture that has been generated by a video camera and stored in a storage medium at a later point in time, and insert an interpolation frame through the process described above to store the resultant data as another piece of moving picture data.

While the embodiment above uses the gyrosensor 240 as an example motion detection means of the digital video camera 100, the present disclosure is not limited thereto. It may be a different sensor as long as it can detect the motion of the digital video camera 100.

While the embodiment above is directed to an example where the motion vector calculation section 302 limits the search range for a motion vector in the horizontal direction based on the result of the detection of the motion of the gyrosensor 240 in the yawing direction, the present disclosure is not limited thereto. The motion vector calculation section 302 may further limit the search range for a motion vector in the vertical direction based on the result of the detection of the motion of the gyrosensor 240 in the pitching direction.

The technique of the present disclosure may be further applicable to software (program) that defines the interpolation frame generating process described above. The operation defined by such a program is as shown in FIG. 3, for example. Such a program may be provided while being stored in a portable storage medium, or may be provided through a telecommunications network. With a processor provided in a computer executing such a program, it is possible to realize the various operations described in the embodiment above.

Embodiments have been described above as an illustration of the technique of the present disclosure. The accompanying drawings and the detailed description are provided for this purpose.

Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The application of the present disclosure is not limited to the digital video camera 100. That is, the present disclosure is applicable to image processing apparatuses capable of converting the frame rate, such as digital still cameras and information terminals equipped with cameras.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-002736 filed Jan. 11, 2012, and No. 2013-000801 filed Jan. 8, 2013, the entire contents of which are hereby incorporated by reference.

What is claimed is:

1. An image processing apparatus for generating an interpolation frame to be inserted between a first frame and a second frame, contiguous with each other, of a moving picture obtained by an image capturing section, the image capturing section including a motion detector unit configured to detect a motion of the image capturing section and output a magnitude of motion representing motion of the image capturing section, the image processing apparatus comprising:
a motion vector calculation section configured to:
receive the magnitude of motion, the first frame, and the second frame; and
calculate a motion vector, wherein:
the motion vector is calculated by performing a matching operation between the first and second frames within a search range; and
the search range is determined based on the magnitude of motion, such that a size of the search range varies as a function of the magnitude of motion; and
an interpolation frame generation section configured to generate the interpolation frame from the first and second frames in accordance with the motion vector.

2. The image processing apparatus of claim 1, further comprising a storage section configured to store information representing a threshold value of the magnitude of motion,
wherein if the magnitude of motion is less than the threshold value, the motion vector calculation section sets a first search range as the search range, and if the magnitude of motion is greater than or equal to the threshold value, the motion vector calculation section sets a second search range different from the first search range as the search range.

3. The image processing apparatus of claim 2, wherein:
the storage section further stores information representing a search range for the motion vector; and
the first search range is set based on the information representing a search range for the motion vector.

4. The image processing apparatus of claim 3, wherein the second search range is determined based on the magnitude of motion.

5. The image processing apparatus of claim 1, wherein the motion vector calculation section further receives information representing a direction of motion of the image capturing section, and limits the search range based on the direction of motion.

6. The image processing apparatus of claim 1, wherein:
the motion vector calculation section divides each of the first and second frames into a plurality of portions, and performs a matching operation between the first and second frames for each of the divided portions to calculate the motion vector for the portion; and
the interpolation frame generation section generates the interpolation frame based on the motion vector calculated for each of the portions.

7. A computer program, stored on a non-transitory computer-readable medium, for use with an image processing apparatus for generating an interpolation frame to be inserted between a first frame and a second frame, contiguous with each other, of a moving picture obtained by an image capturing section, the image capturing section including a motion detector unit configured to detect a motion of the image capturing section and output a magnitude of motion representing motion of the image capturing section, the computer program instructing a computer of the image processing apparatus to execute the steps of:
calculating a motion vector, wherein:
the motion vector is calculated by performing a matching operation between the first and second frames within a search range; and
the search range is determined based on the magnitude of motion of the image capturing section, such that a size of the search range varies as a function of the magnitude of motion; and
generating the interpolation frame from the first and second frames in accordance with the motion vector.

8. An image capturing apparatus for generating an interpolation frame to be inserted between a first frame and a second frame, contiguous with each other, of a moving picture, the image capturing apparatus comprising:

an image capturing section configured to generate data of the moving picture including the first and second frames through a shooting;

a motion detector unit configured to detect a motion of the image capturing section and output a magnitude of motion representing motion of the image capturing section;

a motion vector calculation section configured to:
receive the magnitude of motion, the first frame, and the second frame; and
calculate a motion vector, wherein:
the motion vector is calculated by performing a matching operation between the first and second frames within a search range; and
the search range is determined based on the magnitude of motion, such that a size of the search range varies as a function of the magnitude of motion; and an interpolation frame generation section configured to generate the interpolation frame from the first and second frame in accordance with the motion vector.

9. The image capturing apparatus of claim 8, further comprising a storage section configured to store information representing a threshold value of the magnitude of motion,
wherein if the magnitude of motion is less than the threshold value, the motion vector calculation section sets a first search range as the search range, and if the magnitude of motion is greater than or equal to the threshold value, the motion vector calculation section sets a second search range different from the first search range as the search range.

10. The image capturing apparatus of claim 9, wherein:
the storage section further stores information representing a search range for the motion vector; and
the first search range is set based on the information representing a search range for the motion vector.

11. The image capturing apparatus of claim 10, wherein the second search range is determined based on the magnitude of motion.

12. The image capturing apparatus of claim 8, wherein the motion vector calculation section further receives information representing a direction of motion of the image capturing section, and limits the search range based on the direction of motion.

13. The image capturing apparatus of claim 8, wherein:
the motion vector calculation section divides each of the first and second frames into a plurality of portions, and performs a matching operation between the first and second frames for each of the divided portions to calculate the motion vector for each of the portions, and
the interpolation frame generation section generates the interpolation frame based on the motion vector calculated for each of the portions.

* * * * *